UNITED STATES PATENT OFFICE.

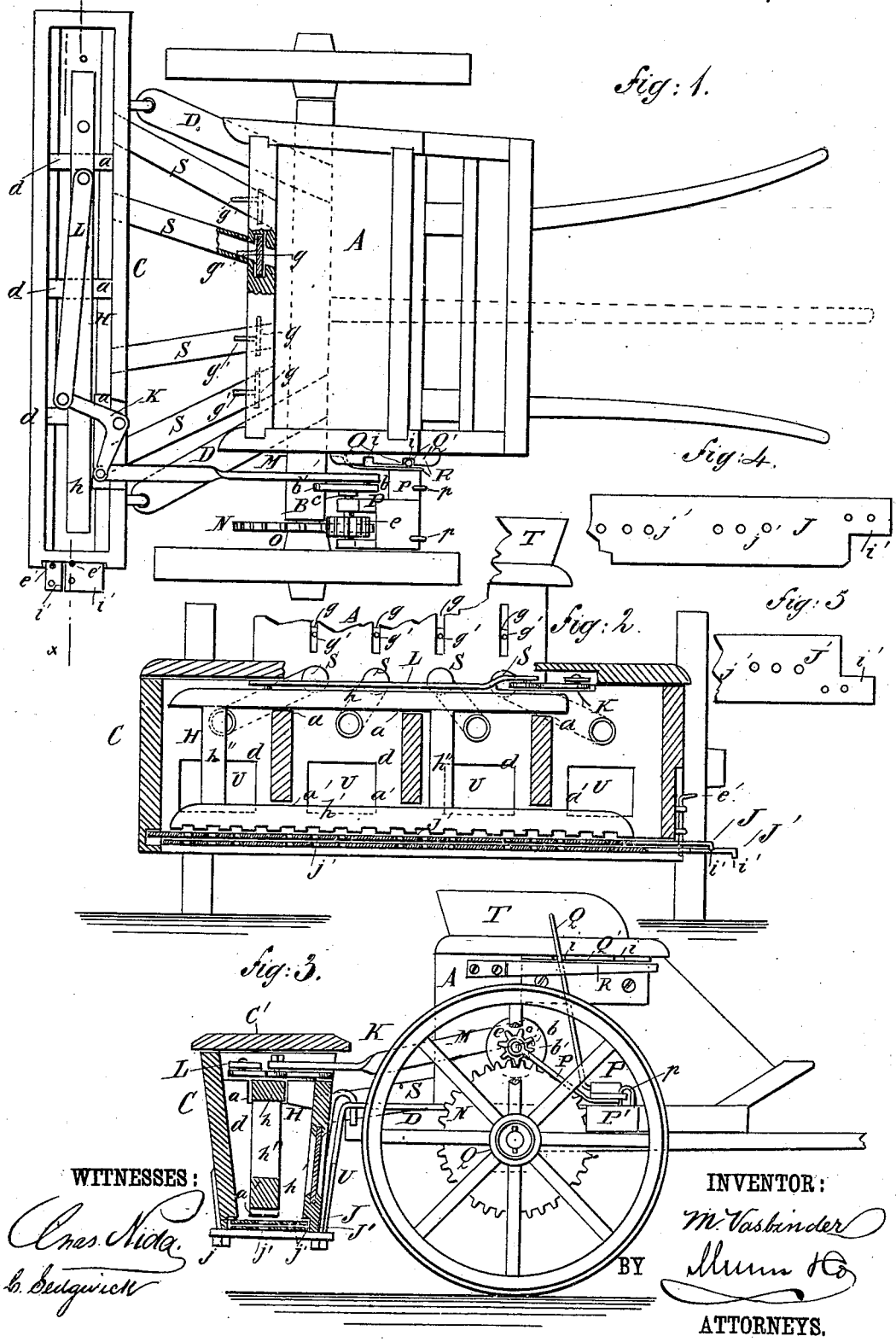

MARK VASBINDER, OF WARREN, OHIO.

SEEDING-MACHINE.

SPECIFICATION forming part of Letters Patent No. 269,353, dated December 19, 1882.

Application filed July 3, 1882. (No model.)

*To all whom it may concern:*

Be it known that I, MARK VASBINDER, of Warren, in the county of Trumbull and State of Ohio, have invented a new and useful Improvement in Seeding-Machines, of which the following is a full, clear, and exact description.

The object of my invention is to provide a practical and efficient seed-sowing machine having such construction that it shall be adapted to sow all kinds of grain and grass seed with equal facility, and to sow grass or clover seed in windy weather.

My invention consists in the peculiar construction and arrangement of parts, as hereinafter fully described, and pointed out in the claims.

Reference is to be had to the accompanying drawings, forming part of this specification, in which similar letters of reference indicate corresponding parts in all the figures.

Figure 1 is a plan view, partly in section, of my new seed-sowing machine, the cover, which also forms the driver's seat of the primary elevated seed-box, being removed. Fig. 2 is a sectional elevation of the same, taken on the line $x\,x$ of Fig. 1. Fig. 3 is a side elevation, partly in section. Figs. 4 and 5 are detailed plan views of the seed-regulating parts removed from the bottom of the distributing seed-box.

A represents the elevated primary seed-box, which, in this instance, is located upon the axle B of the machine; and C represents the distributing seed-box, which is attached to and carried near the ground by the rearwardly-extending arms D D. This distributing seed-box is by preference divided into compartments by the partitions $d\,d$, which serve to keep the grain equally distributed throughout the length of the box. These partitions $d\,d$ are cut away at both top and bottom, as shown at $a\,a'$, and these cut-away places form guides for the agitator H, which agitator is composed of the upper horizontal bar, $h$, lower horizontal bar, $h'$, and the cross-pieces $h''$, which tie the bars $h$ and $h'$ together.

The agitator H is reciprocated in the seed-box to prevent the seed clogging in the perforations of the sliding plates J J', placed in the bottom of the box, by means of the bell-crank lever K, connecting-rod L, attached to one arm of the lever K, and pivoted to the upper side of the horizontal bar $h$, and the connecting-rod or pitman M, attached to the other arm of the lever K, and to the pin $b$ of the crank $b'$, attached to the inner end of the short shaft $c$, which is revolved by means of the pinion $e$, fixed upon the outer end of the shaft $c$, running in contact with the gear-wheel N, fixed upon the hub O of one of the wheels of the machine.

The shaft $c$ is journaled in the plate P, which is hinged upon the cross-piece P' of the frame of the machine by means of the hinges or staples $p\,p$, and this plate is adapted to be raised and lowered by the lever Q for throwing the machine in and out of gear. The lever Q is held in contact with the notched plate Q' by the spring R, and the lever is adapted to engage with one or the other of the notches $i\,i$ of the plate Q', for holding the machine either in or out of gear.

S S are the pipes or conduits leading from the elevated primary seed-box A to the distributing seed-box C. There are as many of these pipes as there are compartments in the box C, and they serve to convey the grain from the box A to the said compartments. The bottom of the box A is made sloping from the forward part to the rear of the box, so as to cause the grain to flow down to the pipes or conduits.

$g\,g$ are sliding plates or valves, provided with the handles $g'\,g'$, for cutting off the flow of grain through the pipes or conduits S S.

U U represent panes of glass set in the compartments of the seed-box C, through which the quantity of seed in the compartments may be ascertained without removing or raising the cover C' of the said box. The handles $g'\,g'$ of the valves $g\,g$ are so arranged as to be in convenient reach of the driver while sitting on the seat T, so that the supply to any of the compartments may be easily replenished when needed without stopping the machine. This seat T also forms the cover of the seed-box A, as will be understood from Fig. 3.

The plates J J' are placed one above the other in the ways $j\,j$, formed in the bottom of the distributing-box C, as shown in Fig. 3. These plates are correspondingly perforated with the holes $j'\ j'$, and are adapted to be moved in the ways by means of the outward extensions $i'\ i'$, so that one or more of the holes in the plates J J' will register for the passage of the grain more or less rapidly, as may be desired, from the distributing-box C to the ground, or they may be moved so as to entirely cut off the flow of seed from the box.

In case the grain is to be sown very thick the plates will be moved so that all of the holes therein will register, as shown in Fig. 2. In case the seed is to be sown very thin the plates will be moved so that only one of the holes in the plates will register. In this manner the quantity of seed to be sown to the acre may be easily regulated. At the end of the box C are placed the sliding stops $e'\ e'$, by which the plates J J' may be locked at any desired position. The lower side of the bar $h'$ of the agitator is formed with notches to facilitate the sifting of the grain through the holes $j'\ j'$ of the plates J J', as shown in Figs. 2 and 3.

Thus constructed and arranged, it will be seen that the machine may be easily regulated for sowing all kinds of grain, and the distributing-box C being carried very near the surface of the ground the machine is adapted to sow grass-seed in windy weather.

Although I have shown in the drawings only four conduits S and four compartments $d$, it will be understood that the machine may be made with six or more conduits and a corresponding number of compartments or a less number than four may be used and not depart from the spirit of my invention.

Having thus fully described my invention, what I claim as new, and desire to secure by Letters Patent, is—

1. A seed-sowing machine having its distributing seed-box C supported on the outer ends of rearwardly-extending arms D, substantially as shown and described, whereby it is carried near the surface of the ground, as and for the purpose set forth.

2. In a seed-sowing machine, the combination, with the primary seed-box A and the rearwardly-extending arms D, of the distributing seed-box C, supported on the outer ends of the said arms, and the conduits S, leading from the box A to the box C, substantially as and for the purpose set forth.

3. In a seed-sowing machine, the combination, with the primary seed-box A and the rearwardly-extending arms D, of the distributing seed-box C, having a series of compartments, and the conduits S, provided with valves $g$, substantially as and for the purpose set forth.

4. In a seed-sowing machine, the combination, with the primary seed-box A, the seed-distributing seed-box C, having a series of compartments, the spouts S, connecting said boxes, and the gear-wheel N, of the agitator H, having its lower edge notched, the bell-crank lever K, the connecting-rods L M, the crank $b'$, the shaft $c$, and the pinion $e$, substantially as and for the purpose set forth.

5. In a seed-sowing machine, the combination, with the seed-distributing box C, provided with the partitions $d$, having their upper and lower portions cut away, as at $a$, of the distributer H, consisting of the upper and lower bars, $h\ h'$, the lower one of which is notched, and the connecting-bars $h''$, and means, substantially as shown and described, for reciprocating the said distributer, as and for the purpose set forth.

MARK × VASBINDER.
his
mark.

Witnesses:
M. A. WEHLE,
J. J. HATFIELD,
WM. CHRISTIANAR,
M. GRIMM.